United States Patent
Said et al.

(10) Patent No.: US 9,285,144 B2
(45) Date of Patent: Mar. 15, 2016

(54) ECONOMIZER FOR AN INTERMITTENT ABSORPTION REFRIGERATION SYSTEM

(71) Applicant: KING FAHD UNIVERSITY OF PETROLEUM AND MINERALS, Dhahran (SA)

(72) Inventors: Syed Ahmed Mohammad Said, Dhahran (SA); Muhammad Umar Siddiqui, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 112 days.

(21) Appl. No.: 14/092,294

(22) Filed: Nov. 27, 2013

(65) Prior Publication Data
US 2015/0143827 A1 May 28, 2015

(51) Int. Cl.
| F25B 15/00 | (2006.01) |
| F25B 17/00 | (2006.01) |
| F25B 27/00 | (2006.01) |
| F25B 17/02 | (2006.01) |

(52) U.S. Cl.
CPC .............. *F25B 27/007* (2013.01); *F25B 17/02* (2013.01); *F25B 2400/24* (2013.01); *Y02B 30/62* (2013.01)

(58) Field of Classification Search
CPC ...... F25B 2400/24; F25B 17/00; F25B 17/02; F25B 25/005; F25B 27/007; Y02B 30/62
USPC .................................................. 62/101, 106
See application file for complete search history.

(56) References Cited

U.S. PATENT DOCUMENTS

| 4,674,476 A * | 6/1987 | Wilson ................ F24D 11/0221 |
| | | 126/585 |
| 4,744,224 A * | 5/1988 | Erickson ................ F24J 2/1047 |
| | | 62/235.1 |
| 5,272,891 A * | 12/1993 | Erickson .................... F24H 4/04 |
| | | 62/477 |
| 5,507,158 A | 4/1996 | Bernier |
| 6,536,677 B2 * | 3/2003 | Melendez-Gonzalez F24F 5/0046 |
| | | 126/587 |
| 2010/0192602 A1* | 8/2010 | Brooks .................. B60H 1/005 |
| | | 62/101 |
| 2010/0287978 A1* | 11/2010 | Moreland ............... F25B 15/10 |
| | | 62/490 |
| 2011/0167854 A1* | 7/2011 | Edwards ............... F24F 3/1417 |
| | | 62/235.1 |
| 2012/0073315 A1* | 3/2012 | Stuerzebecher ........ F25B 15/04 |
| | | 62/101 |
| 2012/0266618 A1 | 10/2012 | Levy et al. |

FOREIGN PATENT DOCUMENTS

| JP | 03013673 B2 | 2/2000 |
| JP | 2003329330 A | 11/2003 |
| JP | 2010032193 A | 2/2010 |

OTHER PUBLICATIONS

W-J. Yang et al., Solar-Assisted Lithium-Bromide Absorption Cooling Systems, Dec. 1987, pp. 409-423.

(Continued)

*Primary Examiner* — Allen Flanigan
*Assistant Examiner* — Filip Zec
(74) *Attorney, Agent, or Firm* — Oblon, McClelland, Maier & Neustadt, L.L.P.

(57) ABSTRACT

An economizer for a solar powered intermittent absorption refrigeration system improves the coefficient of performance of the refrigeration system. The economizer recovers waste energy rejected by an absorber during an absorption process, stores the waste energy, and supplies the waste energy to a generator during a generation process, thereby reducing the amount of energy input needed to operate the system.

12 Claims, 1 Drawing Sheet

(56) References Cited

OTHER PUBLICATIONS

I. Santos-Gonzalez et al., Universidad Nacional Autonoma de Mexico, Comparative Analysis of Compound Parabolic Concentrator Receivers Applied to Solar Cooling.

R. Best et al., Exergy Efficiency of an Ammonia-Water Absorption System for Ice Production, Applied Energy 0306-2619/93/$06.00 © 1993 Elsevier Science Publishers Ltd., England, Applied Energy 45 (1993) 241-256.

* cited by examiner

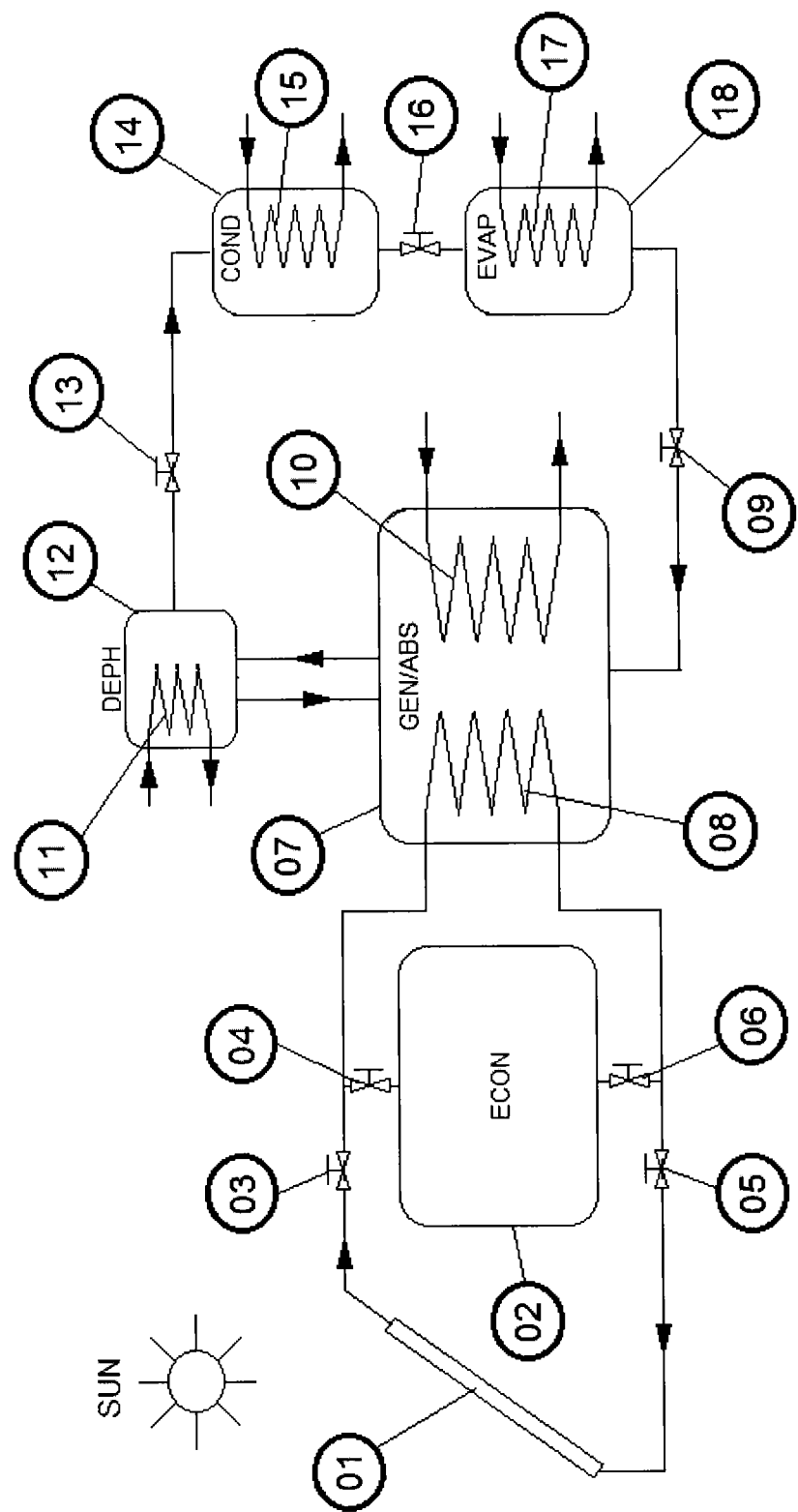

US 9,285,144 B2

ECONOMIZER FOR AN INTERMITTENT ABSORPTION REFRIGERATION SYSTEM

CROSS-REFERENCE TO RELATED APPLICATIONS

This application hereby incorporates by reference the application Ser. No. 14/133,739 titled "Intermittent Absorption Refrigeration System Equipped With A Waste Energy Storage Unit".

BACKGROUND

1. Field of the Disclosure

The present disclosure relates to an intermittent absorption refrigeration method and an economizer for use with an intermittent absorption refrigeration system.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Energy consumption due to air-conditioning and refrigeration applications is significant. The coincidence of maximum cooling loads with the period of highest solar irradiance makes solar energy an excellent candidate for powering refrigeration and air conditioning systems, thereby conserving electrical energy. Absorption chillers can operate even with relatively low-quality heat sources such as exhaust gases from industrial processes or solar radiation. In this regard, absorption chillers have the potential to directly use solar energy to produce refrigeration.

Typical absorption cooling systems utilize a heat source to generate refrigerant vapor out of a strong absorbent-refrigerant solution. The pressurized desorbed liquid refrigerant is then condensed by rejecting heat to the ambient environment. The condensed refrigerant is then used for evaporative cooling by evaporating it under lower pressure, whereby ambient heat is absorbed from the refrigerated space. The evaporated refrigerant is then absorbed back into the weak solution, resulting in a rich solution, thereby enabling the process to be repeated.

Absorption chillers are basically classified into two categories: continuous operation systems and intermittent operation systems. The basic difference between continuous and intermittent systems is their mode of operation. In continuous systems, both generation and absorption of the refrigerant take place at the same time in a continuous manner. However, in intermittent systems, generation and absorption do not take place at the same time; rather, they intermittently follow each other during the operation of the system.

Historically, the coefficient of performance of intermittent systems has typically been much lower than that of continuous systems. This is largely because a continuous system is able to employ a recuperator-type solution heat exchanger, wherein hot and cold fluids flowing past one another in adjacent channels exchange thermal energy. In this manner, waste heat generated in one portion of the system can be utilized to provide heat required by another portion of the system, thereby increasing the overall coefficient of performance of the system.

In a typical absorption cooling system, the generation process requires thermal energy to vaporize refrigerant out of a liquid absorbent-refrigerant solution, while on the other hand, the absorption process releases thermal energy as refrigerant vapor is absorbed into absorbent-refrigerant solution. In a continuous absorption system, the generation and absorption processes occur simultaneously, thus, both hot and cold solutions are continuously present during the operation of the system. Since both hot and cold solutions are present, a recuperator-type solution heat exchanger allows the system to recover thermal energy released by the absorption process and to use that recovered energy to help drive the generation process.

For intermittent systems, by contrast, it is not possible to use a recuperator-type heat exchanger for waste energy recovery, since hot and cold solutions are not available at the same time. Thus, the coefficient of performance of intermittent systems has been limited.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

In an embodiment, the coefficient of performance of a solar powered intermittent absorption system is improved by introducing an economizer into the system.

In another embodiment, the economizer is a regenerative type solution heat exchanger.

In another embodiment, the economizer is a temporary energy storage unit containing the same fluid as that flowing through a solar collector.

In another embodiment, the economizer stores some amount of energy that is rejected by an absorber during a depressurization process.

In another embodiment, the stored energy in the economizer is returned back to the intermittent system during a pressurization process in a generator.

In another embodiment, the economizer reduces the total amount of solar energy input into the generator, thereby increasing the coefficient of performance of the intermittent system.

In another embodiment, a heat-transfer fluid stored in a economizer is used to pressurize and depressurize an absorbent-refrigerant solution in a generator/absorber.

In another embodiment, an intermittent absorption refrigeration system uses water as an absorbent and ammonia as a refrigerant.

In another embodiment, a dephlegmator is used to separate the refrigerant vapor from the absorbent.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawing, wherein:

FIG. 1 is a schematic diagram of a solar absorption refrigeration system equipped with an economizer.

DETAILED DESCRIPTION OF THE EMBODIMENTS

Referring now to the drawing, FIG. 1 shows an embodiment having a solar collector 01, generator/absorber unit 07, economizer 02, dephlegmator 12, condenser unit 14, and evaporator unit 18.

Solar collector 01 converts energy from sunlight into thermal energy that can be used to perform mechanical work on a fluid. Solar collector 01 is a type of thermal collector, which may include any of various configurations of heat-exchange media, such as water, saline, or oil, for example, and structures adapted for use with various heat sources, such as sunlight, exhaust gas, or geothermal heat, for example. Solar collector 01 may have one or more of various geometries including a flat plate, arc, or compound parabolic curve, for example. Likewise, solar collector 01 may exploit optical or other properties of sunlight, including absorption, reflection, or refraction, for example, to harness useable energy from sunlight.

Generator/absorber unit 07 plays the role of both a generator and an absorber. Generator/absorber unit 07 may use a combination of absorbent and refrigerant such as aqua-ammonia or lithium-bromide, for example. Generator/absorber unit 07 may take the form of a pressure vessel constructed of a material such as steel or aluminum that can withstand pressure and that is compatible with the particular refrigerant-absorbent combination used in the system.

Economizer 02 is a regenerative-type heat exchanger, or in other words, a temporary energy storage unit containing a heat-transfer fluid such as water, saline, or oil, for example. In an embodiment, the heat-transfer fluid in economizer 02 can be the same fluid as that used in solar collector 01, or in another embodiment, it can be another fluid in a separate circuit. The main objective of economizer 02 is to store some amount of energy that is rejected by generator/absorber unit 07 when generator/absorber unit 07 is depressurized following the generation process. The stored energy in economizer 02 is returned back to the intermittent system during the pressurization process in generator/absorber unit 07. As a result, economizer 02 reduces the total amount of solar energy input into generator/absorber unit 07, thereby increasing the coefficient of performance of the intermittent system. Economizer 02 may be constructed of a material such as metal or plastic suitable to store the heat-transfer fluid. A thermal insulator such as one or more of a metal foil, fiberglass, or foam, surrounding economizer 02 can help maintain the temperature of fluid stored in economizer 02.

Dephlegmator 12 is a device arranged for the partial condensation of the absorbent-refrigerant vapor. In dephlegmator 12, absorbent condenses while refrigerant remains as a vapor. Dephlegmator 12 may have the form of a pipe with a heat exchanger or heat-sink to draw thermal energy out of the absorbent. Heat rejection may be achieved in dephlegmator 12 by means of a heat exchanger circuit having a coolant fluid flowing in it, or by free convection to the ambient air, for example. Dephlegmator 12 may be constructed of a material such as metal, plastic, or glass, that is suitable for use with a given absorbent-refrigerant combination.

Condenser unit 14 is a device arranged for the condensation of refrigerant. Condensed liquid refrigerant formed in the condenser flows into evaporator unit 18. As with dephlegmator 12, heat rejection in condenser 14 may be achieved by means of a heat exchanger circuit having a coolant fluid flowing in it, or by free convection to the ambient air, for example. Condenser 18 may be constructed of a material such as metal, plastic, or glass, that is suitable for use with a given refrigerant.

Evaporator unit 18 is where a cooling effect is generated by evaporation of the refrigerant. The cooling effect occurs in the evaporator, but the cooling can be made to be felt remotely via a heat exchanger circuit. The evaporator unit includes a pressure vessel that can be constructed of steel or aluminum or another material suitable to withstand pressure and that is compatible with the refrigerant.

Because of the intermittent behavior of the system, a single generator/absorber unit 07 functions as a generator during the daytime and as an absorber at the nighttime. The generator/absorber unit 07 thus is composed of a heat exchanger 08 for heating purposes when functioning as a generator and another heat exchanger 10 for cooling purposes when functioning as an absorber. The solar collector 01 and the economizer 02 are both connected to the generator/absorber unit 07.

The economizer 02 is a temporary energy storage unit that, in an embodiment, contains the same fluid that also flows through the solar collector 01. The energy stored in the economizer 02 is a function of the operating temperature range of the economizer 02 and the heat storage capacity of its energy storing medium. The stored energy in the economizer 02 is returned back to the intermittent system during the pressurization process in the generator/absorber unit 07. As a result, the economizer 02 reduces the total amount of energy input into the generator/absorber unit 07 thus increasing the coefficient of performance of the intermittent system.

In an embodiment, the refrigeration process utilizes water as the absorbent and ammonia as the refrigerant. The process starts with the pressurization of strong aqua-ammonia solution in the generator/absorber unit 07 during the daytime. The pressurization process is initiated by the heat exchange between the economizer 02 and the strong aqua-ammonia solution in the generator/absorber unit 07 through heat exchanger unit 08 keeping the solar collector 01 isolated. The isolation of solar collector 01 is obtained by closing valve 03 and valve 05 while keeping valve 04 and valve 06 opened. As a result, the temperature of the strong solution will rise whereas the temperature of the economizer 02 will drop. Ideally the heat exchange continues until the temperature of the economizer 02 becomes equal to the temperature of the strong aqua-ammonia solution in the generator/absorber unit 07. However, practically, the heat exchange will continue until a minimum temperature difference is maintained between economizer 02 and the strong aqua-ammonia solution in the generator/absorber unit 07 such that the temperature of the economizer 02 is higher than the temperature of the strong solution. Hence, during this process, economizer 02 cooling takes place and partial heating of strong aqua-ammonia solution takes place. After this, the economizer 02 is disconnected from the generator/absorber unit 07 with the help of the valve arrangement and the solar collector field 01 is connected to the generator/absorber unit 07. This is achieved by closing valve 04 and valve 06 while opening valve 03 and valve 05.

Pressurization continues to take place by gaining heat from the solar collector field 01. As a result of this pressurization process, the temperature of the strong aqua-ammonia solution in the generator/absorber unit 07 rises. The generation process at constant pressure takes place in the generator/absorber unit 07 through heat from heat exchanger circuit 08. The temperature of the solution increases as generation takes place during this process. As a result of this generation process, aqua-ammonia vapor is generated and the concentration of strong aqua-ammonia solution drops causing a further increase in the temperature. As generation continues to take place, the water content inside the generated aqua-ammonia vapor increases with the increase in temperature of generator/absorber unit 07.

Removal of water content from the aqua-ammonia vapor is carried out by the dephlegmator 12. Dephlegmator 12 is required to rectify the aqua-ammonia vapor for operation at evaporating temperatures below the freezing point of water.

So, at the top of the generator/absorber unit 07 is located a dephlegmator 12. The dephlegmator 12 also consists of a shell 12 and a heat exchanger circuit 11 for cooling purposes. The binary mixture of aqua-ammonia vapor generated in the generator/absorber unit 07 is cooled by the heat exchanger circuit 11 inside the dephlegmator shell 12 above the condenser temperature. This results in the rectification of ammonia vapor as all the water vapor is condensed inside the dephlegmator 12. The aqua-ammonia condensate from the dephlegmator 12 moves back into the generator/absorber unit 07 whereas the rectified ammonia vapor moves to the condenser shell 14 while passing through valve 13. The generator/absorber unit 07 is separated from the condenser 14 and evaporator units 18 with the help of a ball valve 13 and a throttling valve 09. Hence, throughout the daytime operation of the intermittent system, the generator/absorber unit 07 acts as a generator as heat is added to the system through heat exchanger circuit 08. The purified ammonia vapor then moves to the condenser 14, where it is condensed by rejecting heat to the coolant inside the heat exchanger circuit 15 and stored as a saturated liquid refrigerant inside the evaporator 18 during the daytime.

The generation process is followed by the depressurization of weak aqua-ammonia solution in the generator/absorber unit 07. By the start of the nighttime, the solar collector field 01 is isolated from the system and the economizer 02 is reconnected into the system by closing valve 03 and valve 05 while opening valve 04 and valve 06. The depressurization process is initiated by heat exchange between the economizer 02 and the weak aqua-ammonia solution in the generator/absorber unit 07. As a result, the temperature of the weak solution drops whereas the temperature of economizer 02 rises. Ideally, heat exchange continues to take place till the temperature of economizer 02 becomes equal to the temperature of the weak aqua-ammonia solution in the generator/absorber unit 07. However, practically, the heat exchange will continue until a minimum temperature difference is maintained between economizer 02 and the weak aqua-ammonia solution in the generator/absorber unit 07 such that the temperature of the weak solution is higher than the temperature of the economizer 02. Hence, during this process, heating of economizer 02 takes place and partial cooling of weak aqua-ammonia solution takes place. After this, the economizer 02 is again disconnected from the generator/absorber unit 07 by closing valve 04 and valve 06. With both the solar collector field 01 and the economizer 02 isolated from the system, heat exchanger circuit 10 is connected to the generator/absorber unit 07.

Throughout the nighttime operation of the system, the generator/absorber unit 07 behaves as an absorber for the system. Depressurization of the system continues to take place by heat rejection circuit 10 from the absorber. During depressurization, the saturated liquid refrigerant is kept isolated from the system by ball valve 16 and throttling valve 09. After depressurization is completed, throttling valve 09 is opened which reduces the pressure inside evaporator 18 producing a refrigeration effect in the heat exchanger circuit 17 due to the evaporation of refrigerant. The heat exchanger circuit 17 inside the evaporator 18 is therefore required to be filled with a brine solution if the evaporation temperature is below the freezing point of water to avoid choking the heat exchanger circuit 17 by freezing inside it. The refrigerant vapor then moves from the evaporator 18 to the generator/absorber unit 07 through the throttling valve 09 to be absorbed into the weak solution in the generator/absorber unit 07. Hence, strong solution is produced inside the generator/absorber unit 07 by rejecting the heat of absorption to cooling heat exchanger circuit 10. Coolant is provided to the heat exchanger circuit inside condenser 15 and dephlegmator 11 during the daytime and to the heat exchanger circuit inside the absorber 10 during the nighttime.

The overall coefficient of performance for an intermittent system is basically the ratio of total energy of evaporation, i.e., the refrigeration effect, to the total energy of generation. The total energy of generation is the sum of energy required for pressurizing the generator/absorber unit 07 and the energy required to generate aqua-ammonia vapor. The economizer 02 contributes during the pressurization process only, reducing the energy required by solar input for pressurization and hence reduces the overall energy of generation required to run the intermittent system. However, the economizer 02 does not affect the energy of evaporation, i.e., the refrigeration effect, at all. Thus the increase in coefficient of performance is a direct result of energy conservation due to economizer 02. The increase in the coefficient of performance of the system corresponds to a decrease in the required collector area for a particular load requirement. Since a solar collector may be the most expensive component of such a refrigeration system, this will result in a considerable decrease in the capital cost of such a system. The cost of the economizer 02, which can be an insulated tank with some piping, can be comparatively low. Also, since the temperature in the economizer 02 need not be very high, a moderate level of insulation can be used, thereby reducing cost.

A refrigeration system according to another embodiment is limited to having a single condenser. A refrigeration system according to yet another embodiment is limited to having a single evaporator. In another embodiment, an evaporator is in a heat exchange relationship with an external cooling load circuit. In another embodiment, the external cooling load circuit uses water as the coolant.

In an embodiment, an economizer device is utilized for heating the refrigerant in the generator without operating the solar collector field. In an embodiment, pressurization takes place by isochoric heating of the generator, without the aid of a pump. In another embodiment, a refrigeration effect is achieved without utilizing a refrigerant heat exchanger. In another embodiment, a throttling process is achieved without utilizing a jet ejection mixer. In another embodiment, waste heat is captured and used by the system wherein an economizer is a regenerator type heat exchanger rather than a recuperator type heat exchanger.

In an embodiment, the regenerator is separated from the solar collector. In another embodiment, a refrigeration effect is achieved using a single absorption effect. In another embodiment, an economizer provides indirect heat exchange between a hot solution and a cold solution by first storing thermal energy within a third medium from the hot solution and then supplying the stored thermal energy to the cold solution. In another embodiment, a refrigeration system does not include a recuperator type heat exchanger.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

We claim:

1. An intermittent absorption refrigeration method performed by an absorption refrigeration system, the method comprising:

first pressurizing a strong absorbent-refrigerant solution in a generator/absorber by transferring thermal energy into the strong absorbent-refrigerant solution out of a heat-transfer fluid stored in an economizer;

second pressurizing the strong absorbent-refrigerant solution in the generator/absorber by transferring thermal energy into the strong absorbent-refrigerant solution out of a fluid heated by a thermal collector;

generating from the pressurized strong absorbent-refrigerant solution a first refrigerant vapor and a weak absorbent-refrigerant solution in the generator/absorber by transferring thermal energy into the strong absorbent-refrigerant solution out of the fluid heated by the thermal collector;

condensing the first refrigerant vapor in a condenser by rejecting thermal energy out of the first refrigerant vapor to produce a liquid refrigerant;

storing the liquid refrigerant in an evaporator;

depressurizing the weak absorbent-refrigerant solution in the generator/absorber by transferring thermal energy out of the weak absorbent-refrigerant solution and into the heat-transfer fluid stored in the economizer;

cooling a refrigerated volume by evaporating the liquid refrigerant into a second refrigerant vapor in the evaporator; and absorbing the second refrigerant vapor into the weak absorbent-refrigerant solution to produce the strong absorbent-refrigerant solution, wherein the first pressuring, the second pressuring and the generating are performed in a first mode of operation of the absorption refrigeration system, and the condensing, the depressurizing, the cooling and the absorbing are performed in a second mode of operation of the absorption refrigeration system, and wherein in the first mode of operation of the absorption refrigeration system, the condenser and the evaporator are disconnected from the generator/absorber by a first valve and a second valve.

2. The method of claim 1, wherein the refrigerant is ammonia and the absorbent is water.

3. The method of claim 1, further comprising purifying the first refrigerant vapor by separating the first refrigerant vapor from the absorbent in a dephlegmator.

4. The method of claim 1, further comprising heating the thermal collector by exposing the thermal collector to solar radiation.

5. The method of claim 1, wherein the first mode of operation of the absorption refrigeration system is performed at daytime and the second mode of operation of the absorption refrigeration system is performed at nighttime.

6. An intermittent absorption refrigeration system, comprising:

a generator/absorber unit including a first heat exchanger and a second heat exchanger, wherein the first heat exchanger absorbs a refrigerant into an absorbent to form an absorbent-refrigerant solution in a first mode of operation of the refrigerant system, and wherein the second heat exchanger generates refrigerant vapor from the absorbent-refrigerant solution in a second mode of operation of the refrigerant system;

an economizer that transfers thermal energy into the generator/absorber unit and that receives and stores thermal energy from the generator/absorber unit;

a thermal collector that receives thermal energy from a heat source and that transfer the thermal energy into the generator/absorber unit;

a condenser that converts the refrigerant vapor produced by the generator/absorber unit into liquid refrigerant;

an evaporator unit that stores the liquid refrigerant and in which a refrigeration effect is produced by the evaporation of the liquid refrigerant, wherein the condenser and the evaporator are disconnected from the generator/absorber unit in the second mode of operation of the refrigerant system by a first valve and a second valve.

7. The system of claim 6, wherein the absorbent is water and the refrigerant is ammonia.

8. The system of claim 6, wherein the thermal collector is a solar collector.

9. The system of claim 6, further comprising a dephlegmator for purifying the refrigerant vapor produced by the generator/absorber unit.

10. The system of claim 6, wherein the economizer includes a storage tank adapted to store a heat-transfer fluid, the heat-transfer fluid being one of water, saline solution, and oil.

11. The system of claim 10, wherein the economizer further includes thermal insulation disposed around the storage tank.

12. The system of claim 10, wherein the economizer further includes a third valve disposed between the storage tank and the second heat exchanger to regulate a flow of the heat-transfer fluid between the storage tank and the second heat exchanger.

* * * * *